July 13, 1937.　　　L. F. CARTER　　　2,086,896

AIR SUPPORTED GYROSCOPE

Original Filed July 11, 1934　　3 Sheets-Sheet 1

INVENTOR
LESLIE F. CARTER
BY
Herbert H. Thompson
HIS ATTORNEY.

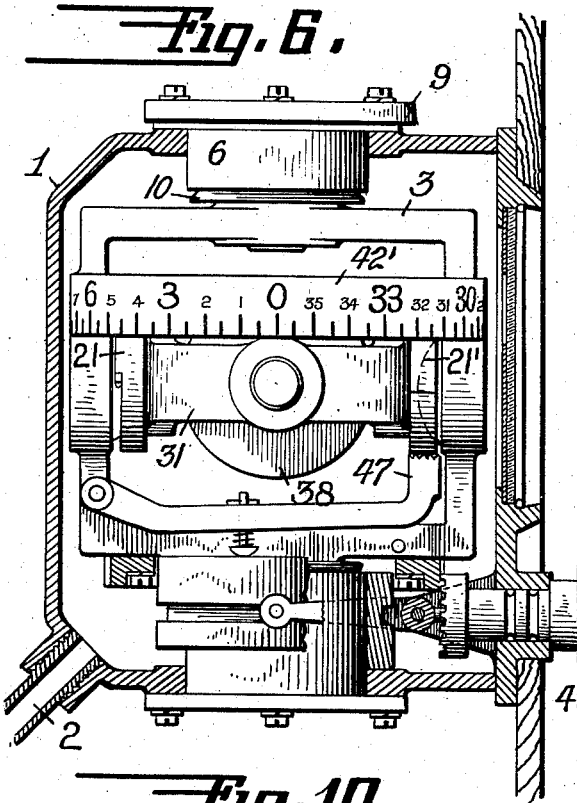
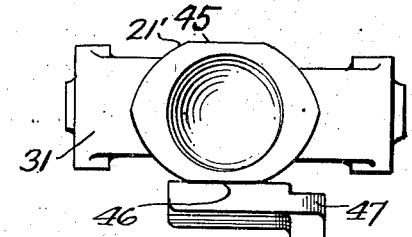
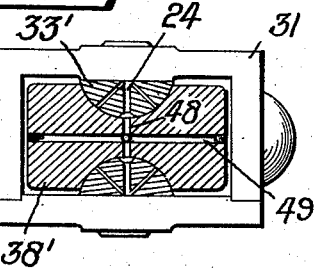
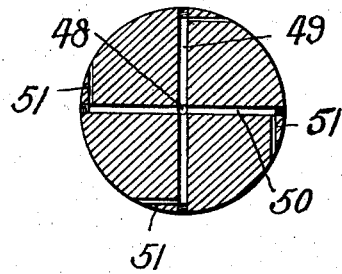
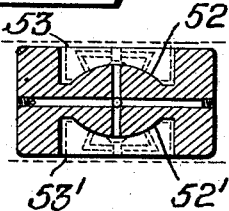

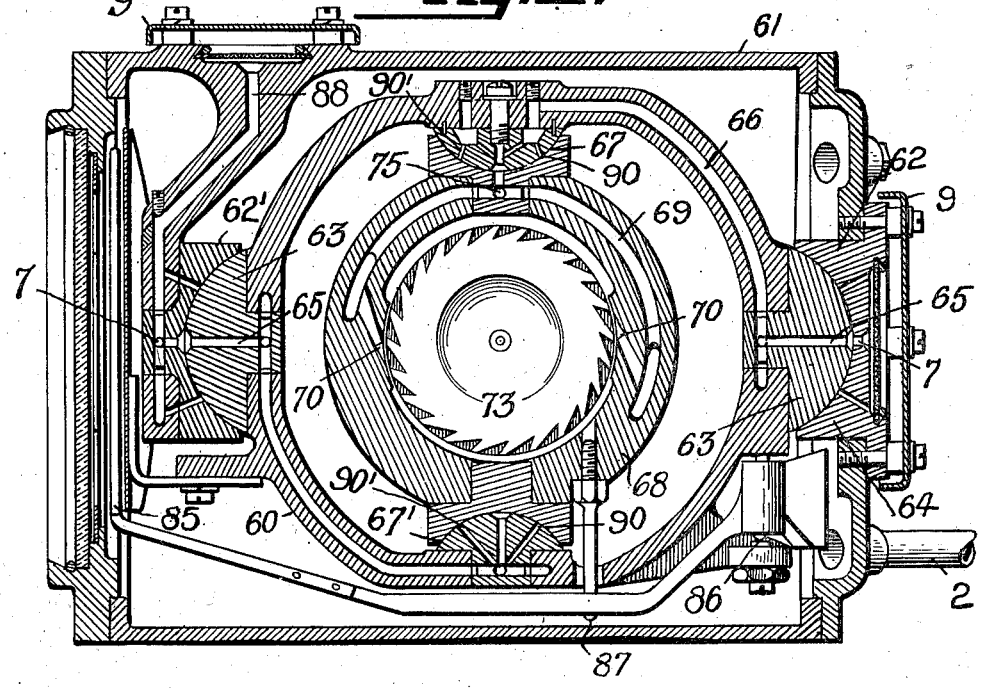
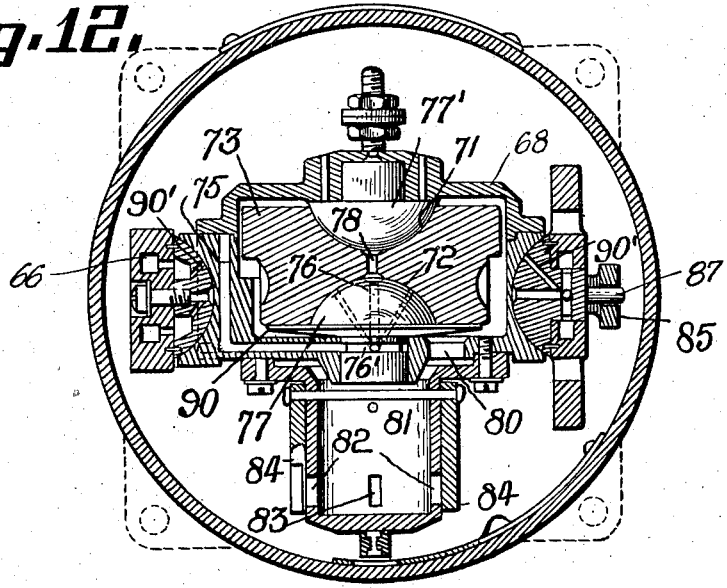

Patented July 13, 1937

2,086,896

UNITED STATES PATENT OFFICE 2,086,896

AIR SUPPORTED GYROSCOPE

Leslie F. Carter, Leonia, N. J., assignor to Sperry Gyroscope Company, Inc., Brooklyn, N. Y., a corporation of New York Application July 11, 1934, Serial No. 734,619
Renewed February 20, 1937

30 Claims. (Cl. 74—5)

This invention relates to gyroscopic instruments for aircraft. The principal purpose of the invention is to improve the bearings for such instruments, both guide bearings and rotor bearings, so as to reduce friction and wear to a minimum. A further object of the invention is to eliminate the use of ball bearings in such instruments, which are necessarily made of steel, since steel pivots, ball bearings and rotor shafts cause deviation of the magnetic compass if placed near the same. A further object of the invention is to employ non-magnetic material throughout which has the same coefficient of expansion, so that unequal expansion due to great variation in temperature may be avoided, thus avoiding binding of the bearings and magnetic disturbances.

I propose to accomplish all of the above functions by eliminating metallic contact in all of said bearings by employing an air film between the parts of each bearing, created by air flow.

Referring to the drawings showing several forms my invention may assume,

Fig. 6 is a side elevation of a modified form of directional gyroscope, having setting means.

Fig. 7 is a detail of the caging cam on the ring, showing how the device may be caged with either side up.

Fig. 8 is a horizontal section through a modified form of rotor, showing the same spun by reaction instead of by direct action of air jets.

Fig. 9 is a similar section of still another form of rotor bearing.

Fig. 10 is a central diametrical section of the rotor of either Fig. 8 or Fig. 9.

Fig. 11 is a horizontal section through a gyro vertical or artificial horizon constructed according to my invention.

Fig. 12 is a vertical section of the same.

Figure 1:
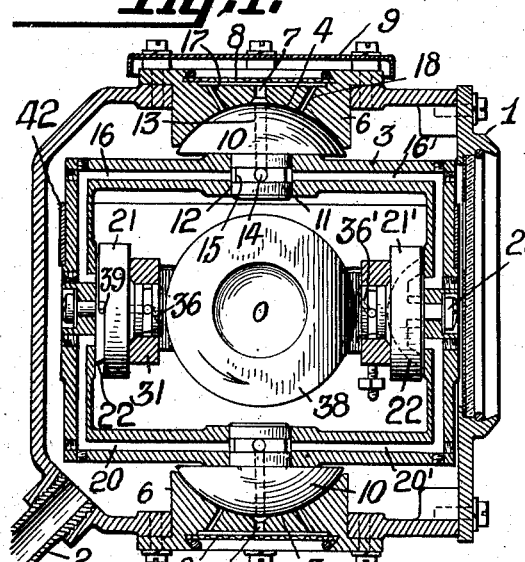
Fig. 1 is a vertical section through a directional gyroscope constructed according to my invention.
Figure 2:
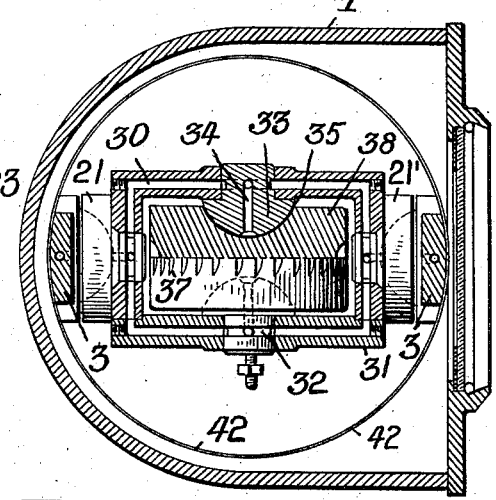
Fig. 2 is a horizontal section of the same, partly in elevation.
Figure 4:
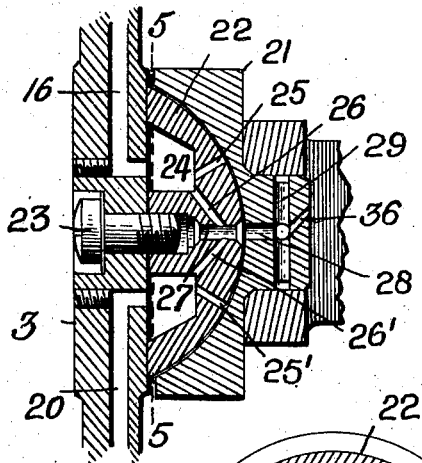
Fig. 4 is an enlarged detail of one of the bearings between the vertical ring and the rotor bearing ring or gimbal ring.
Figure 3:
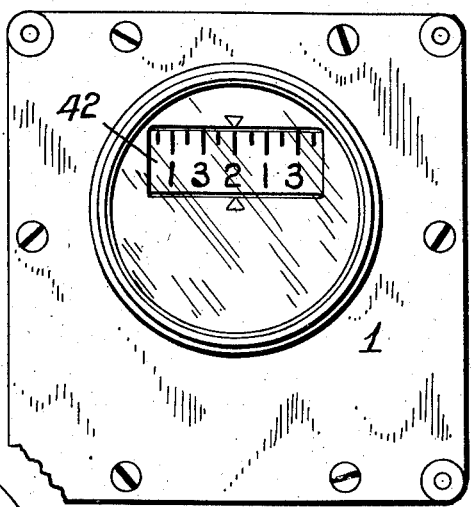
Fig. 3 is a face view of the instrument.
Figure 5:
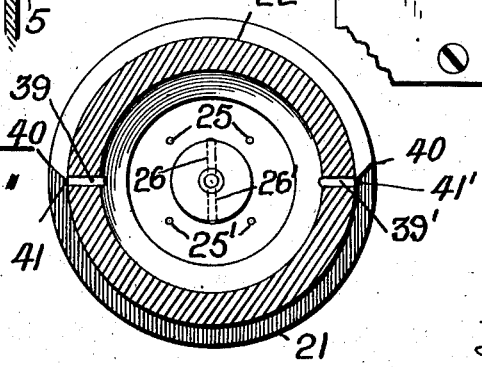
Fig. 5 is a sectional view taken approximately on line 5—5 of Fig. 4.

Preferably I employ negative air pressure (i. e., below atmospheric pressure) for actuating gyroscopic instruments, although obviously positive pressure may be employed if desired. As shown, the directional gyroscope of Figs. 1 to 6 is enclosed in an air tight casing 1, from which air is withdrawn through a pipe 2 by any suitable source of vacuum. The directional gyroscope within said casing is shown as comprising a vertical ring or shell 3 which is supported for turning about a vertical axis in spaced bearings 4 and 5 in casing 1. Each of said bearings is shown as of spherical shape, but the center of curvature of the same should not coincide with the center O of the instrument, as otherwise the whole instrument would turn over and would not be guided within casing 1. As shown, each bearing is formed as a concave surface in a block 6 secured in an aperture in the top or bottom of casing 1. Each block is shown as having a central bore 7 through which air from the outside enters the instrument through screen 8. If desired, a shield 9 may be provided to exclude foreign substances. The complementary part of each bearing is shown as in the form of a convex button 10 having a cylindrical shank 11 secured in the central aperture 12 in the vertical ring. Said button has a central hole 13, normally in line with the hole 7 of block 6, which emerges at 14 to communicate with an annular channel 15 in said shank, which is in communication with channels 16 and 16' in the vertical ring. Preferably the shape of the cup and button is such that the clearance at the sides of the cup is smaller than the clearance at the bottom of the same, so that too free escape of the air is prevented and an ample air cushion provided at the point of greatest load. If the cup and button are substantially hemispherical, I may accomplish this result by making the radii of curvature of the cup and button exactly the same, since the space between the surfaces will increase faster at the bottom than at the sides when the air film enters. If, on the other hand, the cup and button are shallow (see, for instance, Fig. 9) the radius of curvature of the cup is preferably slightly smaller than that of the button so as to maintain the smaller clearance at the edges where the air escapes. In order to furnish additional lifting and centralizing force, I may provide additional radial channels 17 and 18 leading from outside the casing to opposite points in the cup. The channels are preferably restricted so that each can supply only a limited amount of air. By this means the breaking down of the air film is avoided even if the button becomes displaced more at one side than the other from the cup, since air pressure is maintained through all apertures regardless, as otherwise the greater portion of air would escape through the channel at which the greatest clearance occurs.

The air entering channels 16, 16', and corresponding channels 20 and 20', passes into the interior of the horizontal bearings 21 and 21'. As shown, each of said bearings is formed by a hollow button 22 secured to the interior of the vertical ring, as by means of set screw 23. The annular channel 24 within each button is in communication with the channels in the vertical ring and leads air to radial channels 25, 25' for furnishing the air film for the bearing, and to additional channels 26, 26' connected with a common channel 27 for supplying additional air to said bearing and also to the rotor bearings, and for spinning the rotor. A large part of the air passing from channel 27 enters channel 28 in the cup members 21 and 21', and a portion thereof passes into annular groove 29, which is in communication with channels 30 in the rotor bearing ring 31. The air from said channels passes into annular channel 32 in the shanks of buttons 33 furnishing the rotor bearings, the air passing up through a central bore 34 in the same, where it escapes between the button 33 and a convex depression 35 which may be cut at the center of the rotor.

The air jets 36 and 36' for spinning the rotor are shown as leading off from each of the apertures 28 to direct air tangentially against the buckets 37 on the periphery of the rotor 38. Since the driving jets 36, 36' are a part of the rotor bearing ring, the latter has 360 degrees of complete freedom about its horizontal axis to permit of unlimited angles of bank, climb and dive, and to loop the aircraft without interference with the normal function of the gyroscope.

It is essential that means be provided to cause the gyro spin axis to "level off" or, to be more exact, it should be capable of maintaining its own spin axis normally at right angles to the other two axes of freedom, i. e., the horizontal axis through the center of buttons 22 and the vertical axis through the center of buttons 10, in order to obtain maximum direction keeping on the part of the gyro, and for this reason I prefer to refer this "leveling off" to the position of the instrument case or aircraft rather than resort to some form of gravity responsive means, which are invariably affected by acceleration forces.

The means of leveling or erecting the gyro spin axis described hereinafter causes less drift in azimuth during the leveling process than is possible with the present standard form of directional gyro, because the leveling torque is always at right angles to the axis through buttons 22 and also the virtually frictionless air gimbal bearings do not cause the usual small but persistent displacement about the axis which is receiving the precessional torque.

For this purpose I employ the air to level the rotor. I have shown small oppositely directed apertures 39 and 39' through the periphery of the button 22 (Figs. 1 and 5), both of which are normally partially covered by the horizontal edge of notches 40 in the cup member 21 when the gyroscope is horizontal. In case, however, the gyroscope becomes inclined about the horizontal axis 22, one port will become covered more than the other, or it may be completely closed and the other completely open, thereby causing a torque to be exerted through reaction around the vertical axis causing precession of the gyroscope about its horizontal axis to restore horizontality. It is therefore apparent that the gyroscope will work equally well when the ring 31 is inverted from the position shown in Fig. 4. The cut-offs 40 on 21 will then be turned 180° and operate in the reverse sense, but this is compensated for through the fact that the gyro rotation will also be reversed from the same point of view and hence the proper erecting forces are maintained.

The indicating card 42 is shown as secured to the vertical ring and in this instance is provided with a succession of arbitrary figures suitably spaced and identified to enable a predetermined change of course to be accurately made and to maintain a straight course when desired. No setting means are shown, therefore, in this form of the invention. My invention may be equally well applied, however, to a directional gyroscope which may be set from a magnetic compass, as shown in Fig. 6. In this form the card 42' is provided with 360 degree graduations and a hand setting handle 43 is provided to set the instrument in azimuth and lock it in elevation, as explained in prior application of Bert G. Carlson, now Patent #2,061,894, dated November 24, 1936, for Constrained directional gyroscopes.

Since my erecting device operates equally well whether the gyro be in the position shown in the drawings or inverted with respect thereto, I have shown a caging device also operable from either side. To this end the bearing housing or cup member 21' formed on the rotor bearing ring 31 is provided with upper and lower flattened surfaces 45 and 46, against either of which the locking member 47 is adapted to bear, depending on which surface is down. (Fig. 7.)

Instead of spinning the rotor by direct action of air jets, it may be spun by the reaction of air jets escaping tangentially from the periphery thereof. This modification is shown in Fig. 8, in which air is led through the central aperture 24 of the supporting bearing button 33' into an axial bore 48 in the rotor 38', said axial bore communicating with a plurality of radial or diametrical bores 49, 50. The diametrical bores are closed at the surface of the ball and communicate with substantially tangential bores 51, the tangential escape of the air spinning the ball by reaction.

It is obvious that the supporting cups and buttons may be either on the outer and inner member, respectively, or vice versa. Thus, in Fig. 1 the buttons for the vertical bearings have their centers of curvature between the two bearings, although not midway between, while the centers of curvature of the horizontal bearings are without the instrument. The same is true of the rotor bearings of Figs. 2 and 8. In Fig. 9 I have shown how the rotor bearings may be formed with their centers towards each other. In this case the central portion of the rotor is cut to form a convex surface 52 and 52' on each side and the supporting cups 53 and 53' are formed with concave supporting surfaces.

All of the metal parts of the instrument may be made of the same metal, such as aluminum alloy, or brass, according to my invention, since no ball bearings are employed, which are made of steel. Thus two troublesome problems are avoided, first, the trouble due to unequal expansion and contraction of dissimilar metals and, second, the deviations produced on the magnetic compass by the magnetization of the steel balls used in the bearings of prior gyroscopes. The reduction in friction also enables me to use lighter rotors which give as good results as the heavy rotors required to overcome ball bearing friction in the present types of instruments.

Figs. 11 and 12 illustrate how the same principles may be applied to an artificial horizon. In this case the gimbal ring 60 is supported within the outer casing 61 and horizontal bearings 62, 62' formed by buttons 63 on the gimbal ring, cooperating with cups 64 secured in the casing, each provided with air passages for supplying supporting air to the bearings and additional air which is led through central apertures 65 in the buttons to channels 66 within the gimbal ring. Said channels lead to the horizontal bearings 67, 67' which support the rotor bearing casing 68. Each bearing is shown as formed similar to the horizontal bearings 21, 21' in Fig. 1, both bearings being air supported and at least one furnishing air to channel 69 in the casing for spinning the rotor by means of jets 70, and also for supplying the air to the upper and lower rotor bearings 71 and 72 of the rotor 73. The last named function is secured by means of a channel 75 leading from the channel 69 in the gyro casing and which passes downwardly through the casing and then along the bottom thereof to channels 76' in the button 77 supporting the rotor for spinning about a vertical axis. The central channel 76 normally communicates with a hole 78 through the center of the rotor which supplies air for the upper rotor bearing button 77'. Preferably the lower knob 77 is provided with a flange 90 having a flat upper surface on which the lower face of the rotor 73 rests when no air is being supplied. When running, however, the air escaping between the ball 77 and cup 72 flows out between the flange and rotor and assists in supporting the weight of the rotor on the air film so created.

It should be observed that all bearings are large, as compared to usual oil or ball bearings, to keep the unit bearing pressures low so that only moderate air pressure is required.

In the horizontal bearings shown in Fig. 12, it should be noted that no ducts lead to the lower half of the bearing, the duct or ducts 90' alone being employed, because the main pressure on the bearings is downward, so that the main air pressure should be exerted upwardly.

The used air from the spinning jets and supporting surfaces within the gyro casing passes downwardly through apertures 80 into a hollow projection 81 formed with four oppositely directed slots, two of which are shown at 82 in Fig. 12, and one of the opposite pair at 83. Small pendulous shutters 84 are pivoted about each slot to erect the gyroscope, as more fully described in the copending application, now the patent to Bert G. Carlson, No. 1,982,636, dated December 14, 1934, for Air driven gyro verticals.

The horizon bar 85 is shown as pivoted on gimbal 60 at 86 and is connected to the rotor casing by pin 87 in the usual manner. Air for the forward pivot 62' is shown as led into bore 7 from a laterally extending hole 88, which emerges into the atmosphere.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means.

Having described my invention, what I claim and desire to secure by Letters Patent is:

1. In a gyroscope, a rotor, a supporting frame therefor, air supported spaced spherical rotor bearings between said frame and rotor, a ring for supporting said frame, air supported spaced spherical bearings between said ring and frame, and means for leading air under pressure to a point between each pair of bearing surfaces causing continuous outward air flow.

2. In a gyroscope, a rotor, a supporting frame therefor, air supported spaced spherical rotor bearings between said frame and rotor, a ring for supporting said frame, air supported spaced spherical bearings between said ring and frame, an outer casing, air supported spaced spherical bearings between said casing and ring, and means for leading air under pressure to a point between each pair of bearing surfaces causing continuous outward air flow.

3. A flywheel or rotor member, a rotor bearing frame member, a pair of spaced bearings between said members comprising a pair of spherical projections on one of said members, complementary cup shaped sockets in the other of said members, and means for causing a continuous air flow between said surfaces to float the rotor between two air films and without mechanical contact.

4. A flywheel or rotor member, a rotor bearing frame member, a pair of spaced bearings between said members comprising a pair of spherical projections on one of said members, complementary cup shaped sockets in the other of said members, a jet for spinning the rotor, and means for leading in air under pressure to cause continuous air flow between said bearings and also to said jet to furnish air bearings for and to spin the rotor.

5. Air bearings as claimed in claim 3, in which the cup and spherical projection have the same radius, for the purpose specified.

6. Air bearings as claimed in claim 3, in which the center of curvature of the two pairs of spaced bearings does not coincide with the center of the rotor.

7. A directional gyroscope comprising an outer casing, a vertical ring, upper and lower spherical large surface bearings between said casing and ring, a rotor bearing frame, spherical large surface bearings supporting said frame in said ring, a rotor mounted in said frame on similar bearings, all of said parts being of the same non-magnetic material, and means for supplying air between said bearings.

8. An air driven air supported artificial horizon for aircraft, comprising a normally horizontal rotor, a rotor bearing casing, upper and lower spherical air bearings for the rotor in said casing, a gimbal ring, spherical air bearings between said gimbal and rotor casing, an outer casing, spherical air bearings between said outer casing and gimbal, and air erecting means on said rotor casing.

9. A flywheel or rotor member, a rotor bearing frame member, a pair of spaced bearings between said members comprising a pair of spherical projections on one of said members, complementary cup shaped sockets in the other of said members, and registering apertures through said cups and projections for leading air under pressure between the bearing surfaces so formed.

10. A flywheel or rotor member, a rotor bearing frame member, a pair of spaced bearings between said members comprising a pair of spherical projections on one of said two members, complementary cup shaped sockets in the other of said members, and registering apertures through one of said cups and projections for leading air under pressure into one bearing, said rotor also having an aperture therethrough registering with said other apertures to lead air into the other bearing.

11. In an air borne directional gyroscope having a vertical ring and rotor bearing casing, a horizontal air bearing between said ring and casing including a cup and a button, one of which is on said ring and the other on said casing, laterally directed holes permitting the escape of some air from said bearing, and a shield adapted to differentially cover said holes, said shield and holes being one in said cup and the other in said button, whereby an erecting torque is developed upon inclination of the rotor casing.

12. A flywheel or rotor member, a rotor bearing frame member, a pair of spaced bearings between said members comprising a pair of spherical projections on one of said members, complementary cup shaped sockets in the other of said members, and registering apertures through said cups and projections for leading air under pressure between the bearing surfaces so formed, the rotor having an axial aperture and a plurality of tangential apertures, said axial aperture connecting at least one pair of said registering apertures with said tangential apertures for spinning the rotor by reaction.

13. Air bearings for supporting a sensitive element for rotational freedom about a single axis but preventing relative axial movement, comprising spaced cup shaped members, the centers of curvature of which are spaced, corresponding spaced buttons, the curvature of said cups and buttons being such that a minimum clearance is maintained between the same at the points of air emergence between said cup and button, for the purpose specified.

14. Air bearings for supporting a sensitive element for rotational freedom about a single axis but preventing relative axial movement, comprising spaced cup shaped members, corresponding spaced buttons, the radius of curvature of each cup and button being the same whereby less clearance under operating conditions is provided around the edge of the cup than at the center to restrict the air flow.

15. A horizontal pivotal support for an instrument, including a pair of cooperating cups and buttons on opposite sides of said instrument, providing both thrust and radial bearings, and means for supplying an air flow film between the surfaces of each pair, including a duct directing the air upwardly and inwardly.

16. An air driven air supported artificial horizon for aircraft, comprising a normally horizontal rotor, a rotor bearing casing, and upper and lower spherical air bearings for the rotor in said casing, said lower bearing having a horizontal flange projecting beyond the same under a flat portion of the rotor, the air escaping from said bearing passing between said flange and rotor to assist in supporting the rotor.

17. Air bearings for supporting a directional gyroscope for freedom about a vertical axis, the combination with an outer casing and the shell which is journaled therein, of spaced cup shaped members in said casing, cooperating spaced spherically shaped buttons on the top and bottom of said shell, the centers of curvature of said spaced members being vertically spaced, whereby freedom about only the vertical axis is provided.

18. A horizontal pivotal support for a sensitive element, the combination with a support and said element, a cup member and a cooperating button member between said support and element on each side thereof, providing both end thrust and radial bearings, at least one member of each pair of members having a plurality of restricted ducts therethrough adapted to lead compressed air between the adjacent surfaces of said members, and the centers of curvature of each pair being spaced.

19. Air bearings for supporting a sensitive element for rotational freedom about a single axis but preventing relative axial movement, comprising spaced cup shaped members, corresponding spaced buttons, one of each pair of cups and buttons having a plurality of spaced, restricted apertures therethrough and means whereby compressed air may be directed through said apertures between each cup and button, the curvature of said cups and buttons being such that a minimum clearance is maintained between the same adjacent the points of air emergence between said cup and button.

20. An air borne rotor as claimed in claim 12, wherein a plurality of additional spaced, restricted apertures are provided through the stationary member of each pair of cooperating bearing members to increase the radial support.

21. In a gyroscope, a rotor, a supporting frame therefor, air supported spaced spherical bearings between said frame and rotor, a ring for supporting said frame, air supported spaced spherical bearings between said ring and frame, an outer casing, air supported spaced spherical bearings between said casing and ring, and a plurality of spaced restricted ports for leading air under pressure to spaced points between each pair of bearing surfaces causing continuous outward air flow.

22. In a three degree of freedom gyroscope, a rotor and rotor bearing frame, a supporting ring for pivotally supporting said frame, and an outer casing for pivotally supporting said ring and pivotal bearings between said frame and ring and ring and casing, each of said bearings having working surfaces which are large surfaces complementally curved and which extend on at least two sides of the frame or ring, and means for supplying air under pressure between said complemental surfaces to cause continuous outward air flow.

23. In gyroscopic apparatus, the combination with the rotor and rotor surrounding bearing frame, of bearing means for mounting said frame within a second frame for freedom about an axis perpendicular to the rotor axis, including complementary surfaces on said two frames lying on both sides of said rotor and curved in two planes and having means whereby air under pressure flows between said surfaces to support said first frame, the centers of curvature in at least one plane being spaced, whereby relative rotation of said frames is permitted about said first axis only and relative translation prevented.

24. In a gyroscope, a rotor and rotor bearing frame, a ring for pivotally supporting said frame, air supported spherical bearings between said frame and ring supporting said frame for oscillation about a single axis, an outer casing, air supported spherical bearings between said casing and ring supporting said ring for oscillation about a second single axis, and means for leading air under pressure to a point between each pair of cooperating bearing surfaces to cause a continuous air flow film.

25. A flywheel or rotor member as claimed in claim 3, in which said rotor member is provided with tangential jets therein for spinning the same by reaction, the air thereto being supplied by the means supplying air flow to the said rotor bearings.

26. In a directional gyroscope, the combination with a rotor and rotor bearing frame, a vertical ring within which said frame is mounted for oscillation about a horizontal axis, means for leading air under pressure along said axis for spinning the rotor, a pair of small ports for discharging air laterally connected with said means, and shutter means adjacent said ports, said ports and shutter means being one on the vertical ring and the other on said frame, whereby an erecting torque is exerted on the gyroscope about its vertical axis upon inclination thereof with respect to said vertical ring.

27. An air driven air supported artificial horizon for aircraft, comprising a normally horizontal air spun rotor, a rotor bearing casing, a gimbal ring, spherical air bearings between said gimbal and rotor casing, an outer closed casing, spherical air bearings between said outer casing and gimbal, air erecting means on said rotor casing, means for pumping air from said outer casing, and means for leading atmospheric air into said rotor and said bearings.

28. In a directional gyroscope, a rotor, a supporting frame therefor, air supported spaced spherical rotor bearings between said frame and rotor, a ring for supporting said frame, air supported spaced spherical bearings between said ring and frame, means for leading air under pressure to a point between each pair of bearing surfaces, causing continuous outward air flow, auxiliary oppositely acting discharge ports from at least one of said bearings, and shutter means for differentially covering said ports on inclination of said frame for erecting the gyroscope.

29. In a directional gyroscope, the combination with a rotor and rotor bearing frame, a vertical ring within which said frame is mounted for oscillation about a horizontal axis, means for leading air under pressure along said axis, a pair of small ports mounted on said ring and lying in the same plane as said horizontal axis for discharging air laterally connected with said means to exert torques about the vertical axis of said ring, and shutter means adjacent said ports mounted on said frame and adapted to differentially cover said ports on inclination of said frame, whereby an erecting torque is exerted on the gyroscope about its vertical axis upon inclination thereof with respect to said vertical ring.

30. In an air borne directional gyroscope having a frame tilting with the gyroscope and a relatively vertical part on which said frame is pivoted, a horizontal air bearing between said frame and part including two portions, viz. a cup and a button, one of which is on said frame and the other on said part, there being laterally directed holes in the portion of the air bearing on said part permitting the escape of some air from said bearing, and a shield adapted to differentially cover said holes, said shield and holes being one in said cup and the other in said button, whereby an erecting torque is developed upon inclination of the frame.

LESLIE F. CARTER.